(12) United States Patent
Jacob

(10) Patent No.: US 6,254,487 B1
(45) Date of Patent: Jul. 3, 2001

(54) CV-JOINTED SHAFT WITH TWO FIXED JOINTS AND SEPERATE SLIDING MEANS

(75) Inventor: Werner Jacob, Frankfurt (DE)

(73) Assignee: GKN Lobro GmbH (DE)

(*) Notice: Subject to any disclaimer, the term of this patent is extended or adjusted under 35 U.S.C. 154(b) by 0 days.

(21) Appl. No.: 09/211,956

(22) Filed: Dec. 15, 1998

(30) Foreign Application Priority Data

Dec. 19, 1997 (DE) ............................................ 197 56 768

(51) Int. Cl.[7] ........................... F16C 3/035; F16D 3/16
(52) U.S. Cl. ..................... 464/167; 464/140; 464/906
(58) Field of Search .................................. 464/140, 139, 464/145, 146, 141, 182, 183, 167, 165, 164, 162, 173, 175, 906

(56) References Cited

U.S. PATENT DOCUMENTS

| | | | |
|---|---|---|---|
| 754,066 | * 3/1904 | Hoffmann | 464/167 |
| 4,177,654 | * 12/1979 | Aucktor | 464/906 |
| 5,052,979 | * 10/1991 | Welschof et al. | 464/140 |
| 5,453,052 | * 9/1995 | Harz et al. | 464/145 |
| 5,611,733 | 3/1997 | Jacob et al. | |

FOREIGN PATENT DOCUMENTS 2107655A  5/1983 (GB).

* cited by examiner

Primary Examiner—Lynne H. Browne
Assistant Examiner—Kenneth Thompson

(57) ABSTRACT

The invention relates to a CV-jointed shaft with a first and a second constant velocity fixed joint 1, 1' and an intermediate shaft 14. The intermediate shaft 14 comprises a plunging sleeve 22 in which there is received a plunging journal 15 by means of balls. The plunging journal 15 and the intermediate shaft 14 are each provided with a plug-in portion 16, 25 which are identical in shape and are received in receiving bores 7 of the inner parts 5 of the two constant velocity fixed joints 1, 1'. By using this design it is possible to provide a CV-jointed shaft wherein, to a considerable extent, the constant velocity fixed joints 1, 1' can be assembled of identical components.

3 Claims, 1 Drawing Sheet

CV-JOINTED SHAFT WITH TWO FIXED JOINTS AND SEPERATE SLIDING MEANS

BACKGROUND OF THE INVENTION

The invention relates to a CV-jointed shaft having a first and a second constant velocity fixed joint. Each joint comprises an outer part with outer running grooves, an inner part with inner running grooves and a cage arranged therebetween for guiding balls which engage opposed outer running grooves and inner running grooves, forming a pair. The outer part is provided with first connecting means and the inner part is provided with second connecting means, having a plunging assembly which comprises a plunging journal connected to the inner part of the first constant velocity joint and a plunging sleeve connected to an intermediate shaft. Rolling contact members engage opposing running grooves arranged in the plunging journal and the plunging sleeve, and the intermediate shaft is connected to the inner part of the second constant velocity fixed joint.

Such a CV-jointed shaft is described in U.S. Pat. No. 5,611,733. The plunging journal is produced to be integral with the inner part of the first constant velocity fixed joint, with a journal being formed on to the inner part of the second constant velocity fixed joint. The intermediate shaft, by means of a first portion, is firmly positioned on the journal of the inner part of the second constant velocity fixed joint. At its other end, the intermediate shaft carries the plunging sleeve. The disadvantage of this embodiment is that the inner parts of the two constant velocity joints have to be of a different design. This results in higher costs, especially for the tools for producing the inner parts.

It is the object of the invention to propose a CV-jointed shaft which can be produced at reasonable cost.

SUMMARY OF THE INVENTION

In accordance with the invention, the objective is achieved in that the inner parts of both constant velocity joints comprise identical receiving bores, that the intermediate shaft, at its end removed from the plunging sleeve, and the plunging journal, at its end projecting from the plunging sleeve, are each provided with an plug-in portion, which two portions are designed to match the two receiving bores.

The advantage of this embodiment is that, with the exception of the connecting means for the outer parts, identically designed CV fixed joints can be used for the CV-jointed shaft. The resulting advantage consists in that the degree of deformation for the inner parts as compared to prior art inner parts can be greatly reduced, because as a rule it is possible to use inner parts produced by non-chip forming methods in order to keep costs at a reasonable level and to achieve a high degree of repeat accuracy. The intermediate shaft is preferably provided in the form of a tubular shaft and comprises the plunging sleeve. For the plug-in portion there is selected a wall which is thicker than the wall portion in the region between the plug-in portion and the portion designed as a plunging sleeve. Such an intermediate shaft, starting from a tube, can be given its final shape by hammering, for example.

Furthermore, the plunging journal is also tubular in order to keep the deformation forces as low as possible. The plunging journal with the running grooves and the teeth in the region of the plug-in portion can also be produced by hammering. To achieve a rotationally fast connection between the inner parts and the plug-in portions of the plunging journal and the intermediate shaft respectively, these parts and portions respectively are provided with teeth which extend parallel relative to the longitudinal axis of the inner parts.

A particularly advantageous embodiment of the CV-jointed shaft is achieved if the outer parts of the constant velocity fixed joints are each associated with a supporting element with a hollow spherical face comprising a supporting face which serves to support a spherical control face of a dish-shaped control element. The edge of said dish-shaped control element comprises a planar end face on which the inner part is supported by means of a planar end face. The longitudinal axis of the inner part is positioned perpendicularly on the latter planar end face. The inner part is held and centered relative to the outer part by balls which are guided in a cage. The cage, by means of a hollow spherical face, is supported on a spherical outer face of the inner part. There is no contact between the cage and the outer part. As, in the aligned condition, the inner running grooves and the outer running grooves, from the CV fixed joint end with which the supporting element is associated, comprise a narrowing cross-section along the longitudinal axis, the inner part is centered relative to the outer part along the longitudinal axis on the joint articulation center by the control element. By designing and arranging the control element in this way, it is possible to select a relatively large diameter for the receiving bore. It only has to be ensured that underneath the inner running grooves there is sufficient material in the radial direction to permit the transmission of torque. One type of constant velocity fixed joint which will particularly benefit from this invention is claimed and described in greater detail in the U.S. patent application Ser. No. 09/193,097.

BRIEF DESCRIPTION OF THE DRAWINGS

A preferred embodiment of the invention is diagrammatically illustrated in the drawing and described below with reference thereto.

DETAILED DESCRIPTION

Figure 1:
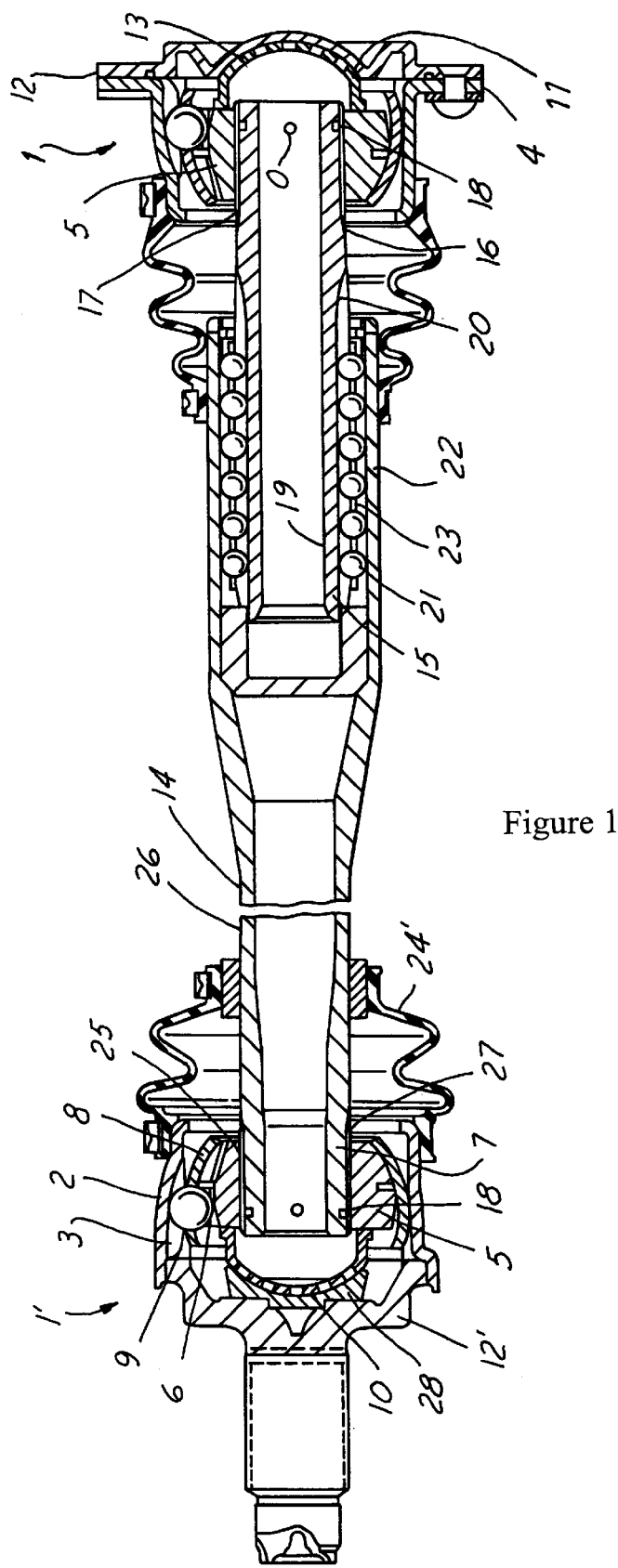

The inventive CV-jointed shaft consists of two constant velocity fixed joints 1, 1' and one intermediate shaft 14 with a plunging assembly. The CV-jointed shaft as illustrated serves to drive the rear wheels of a motor vehicle, for example, with the constant velocity fixed joint 1, by connecting means to be described below, being connected to the rear wheel differential of the vehicle, and with the constant velocity fixed joint 1', by means of further connecting means yet to be described, being connected to the wheel hub of the rear wheel of the motor vehicle. The two CV fixed joints 1, 1' are substantially of identical design. To the extent that this is significant for the present invention, the differently designed components will also be described in greater detail below. To provide a clearer overview, the reference numbers of the individual components are sometimes associated with the one and sometimes with the other CV fixed joint 1, 1'. The two constant velocity fixed joints 1, 1' each comprise an outer part 2 which is provided in the form of a plate metal part, i.e. it is thin-walled. The latter, in its inner face, is provided with a plurality of outer running grooves 3 which are circumferentially distributed around the longitudinal axis of the outer part 2, which extend in meridian planes and which, starting from the opening end associated with the flange 4 and the connecting journal respectively, constituting the connecting means, extend in an undercut-free way. This means that, in the direction away from the flange 4, the track base of the outer running grooves 3 approaches the longitudinal axis of the outer part 2. By providing the outer part 2 in the form of a plate metal part, the wall of same, in a cross-sectional view, comprises bulges in which the outer running grooves 3 are arranged. In the cavity of each outer part 2, there is accommodated an inner part 5. The inner part 5 is provided with inner running grooves 6 which are arranged in the outer face of same so as to be circumferentially distributed in accordance with the outer running grooves 3. The inner running grooves 6 comprise a track base which extends away from the flange 4 and the connecting journal respectively, and from the longitudinal axis of the inner part. The inner part 5, at its outer face portion removed from the flange 4, comprises a spherical face on which there is supported a cage 8 by means of its hollow spherical face. The cage 8 is provided with windows which are circumferentially distributed in accordance with the pairs of outer running grooves 3 and inner running grooves 6 and in each there is received a ball 9 which projects radially outwardly and inwardly from the windows beyond the cage 8 and, for torque transmitting purposes, engages the outer running grooves 3 and inner running grooves 6 respectively. Because of the above-described course taken by the outer running grooves 3 and inner running grooves 6, the balls 9, during the transmission of torque towards the flange 4 and connecting journal respectively, apply a force to the cage 8, which force holds the cage 8 in contact with the inner part 5. There is no contact between the outer face of the cage 8 and the inner face of the outer part 2. The inner part 6 is centered relative to the outer part 2 along the longitudinal axis of the outer part 2 away from the flange 4 and connecting journal respectively, and also in the radial direction, by the balls 9. Furthermore, each inner part 5 comprises a toothed receiving bore 7, with the teeth being pointed and extending parallel to the longitudinal axis of the inner part 5. Towards the flange 4 and connecting journal respectively, the inner part 5 with the cage 8 and the balls 9 is held in the outer part 2 by a control element 10 which is dish-shaped and whose edge is provided with an end face on which the inner part 5 is supported by an end face. Furthermore, the control element 10 comprises a spherical control face 11 which rests against a supporting face 13 of a supporting element 12 and a supporting disc 28 which is provided in the form of a hollow sphere. The ball radii of the control face 11 and of the control face 13 are centered on the joint articulation center 0. The supporting element 12 for the constant velocity fixed joint 1 is provided with a flange portion by means of which it is fixed, for example by riveting, to the flange 4 of the outer part 2. In this way, the inner part 5 is centered relative to the outer part 2 on the joint articulation center. In the case of the constant velocity fixed joint 1', the supporting element 12' holds the supporting disc 28.

The second constant velocity fixed joint 1', however, differs from the first constant velocity fixed joint 1 as far as the outer part 2 is concerned. The outer part 2 comprises a receiving portion for the outer circumference of the supporting element 12', so that the latter, which is a solid part, can be connected in a rotationally fast way to the outer part 2 by means of a cross-section which deviates from the circular cross-section. Furthermore, the supporting element 12' comprises the connecting journal which serves to connect the second constant velocity fixed joint 1' to the wheel hub of a motor vehicle for example, whereas the flange 4 of the first constant velocity fixed joint 1 serves to be connected to an output flange of one of the output bevel gears of a differential. The two constant velocity fixed joints 1, 1' are connected to one another by an intermediate shaft 14 with a plunging assembly which permits a change in the distance between the joint articulation centers of the two CV fixed joints 1, 1'. The plunging assembly comprises a plunging journal 15 which is tubular and comprises a bore 19.

Furthermore, it comprises a plug-in portion 16 whose outside is provided with a set of teeth 17 which is designed to match the receiving bores 7 of the two CV fixed joints 1, 1'. The plunging journal 15 is secured in one of the two plug-in bores 7 by means of a securing ring 18. Furthermore, the plunging journal 15, comprises running grooves 20 in its outer face, which extend parallel to the longitudinal axis of the inner part 5 and in which the rolling contact members in the form of balls are able to roll. The latter are guided by a cage for example. The plunging journal 15 is inserted into a plunging sleeve 22 which is associated with the intermediate shaft 14, i.e. it is produced so as to be integral therewith. Plunging sleeve 22, is provided with running grooves 23 in its inner face, which are circumferentially distributed in accordance with the running grooves 20 and which are engaged by the balls 21. This assembly permits the transmission of torque between the plunging journal 15 and the intermediate shaft 14, as well as a displacement of the plunging sleeve 22 and of the plunging journal 25 towards the longitudinal axis relative to one another. The assembly is sealed by a convoluted boot 24 which, by means of its large diameter, is secured on the outer circumference of the outer part 2 of the CV fixed joint 1 and by means of its small diameter on the outer face of the plunging sleeve 22. Following the plunging sleeve 22, the intermediate shaft 14 comprises a central portion 26 which, towards the other end, changes into a plug-in portion 25 which comprises a thicker wall than the central portion 26 and, on its outer face, is provided with a set of teeth 27 which corresponds to the set of teeth 17 of the plunging journal 15 and is inserted into the receiving bore 7 of the inner part 5 of the second CV fixed joint 1' and secured therein by a securing ring 18. For sealing the CV fixed joint 1', there is provided a further convoluted boot 24' which, by means of its large diameter, is secured on the outer face of the outer part 2 of the second CV fixed joint 1' and, by means of its small diameter, on the outer face of the intermediate shaft 14.

Although a preferred embodiment of this invention has been disclosed, a worker of ordinary skill in the art would recognize that modifications come within the scope of this invention. For that reason the following claims should be studied to determine the true scope and content.

What is claimed is:

1. A constant velocity-jointed shaft comprising:

a first and a second constant velocity fixed joint each having an outer part with outer running grooves, an inner part with inner running grooves, a cage arranged therebetween for guiding balls which engage opposed outer running grooves and inner running grooves, forming a pair, with said outer part being provided with first connecting means and said inner part being provided with second connecting means, a plunging assembly having a plunging journal connected to said inner part of said first constant velocity joint and a plunging sleeve connected to an intermediate shaft, with rolling contact members engaging opposing running grooves of said plunging journal and said plunging sleeve, and with said intermediate shaft being connected to said inner part of said second constant velocity fixed joint; and said inner parts of both said first and second constant velocity fixed joints having generally identical receiving bores, said intermediate shaft, at an end remote from said plunging sleeve, and said plunging journal, at an end projecting from the plunging sleeve, each provided with substantially identical plug-in portions each of which match said respective receiving bores, and wherein said intermediate shaft is provided in the form of a tubular shaft and comprises said plunging sleeve and that, in the region of said plug-in portion of said intermediate shaft, the wall of said intermediate shaft is thicker than in a region between said plug-in portion of said intermediate shaft and said plunging sleeve.

2. A constant velocity jointed shaft according to claim 1, wherein said plunging journal is tubular.

3. A constant velocity jointed shaft according to claim 1, wherein said receiving bores of said inner parts and said insertable portions having matching teeth for establishing a rotationally fast connection.

\* \* \* \* \*